Oct. 9, 1962  W. H. BLACKER  3,057,510
TRAY TO SERVE AND HOLD FOOD
Filed May 25, 1960  2 Sheets-Sheet 1

INVENTOR.
William H. Blacker
BY Harold E. Cole
Attorney

Oct. 9, 1962 W. H. BLACKER 3,057,510
TRAY TO SERVE AND HOLD FOOD
Filed May 25, 1960 2 Sheets-Sheet 2
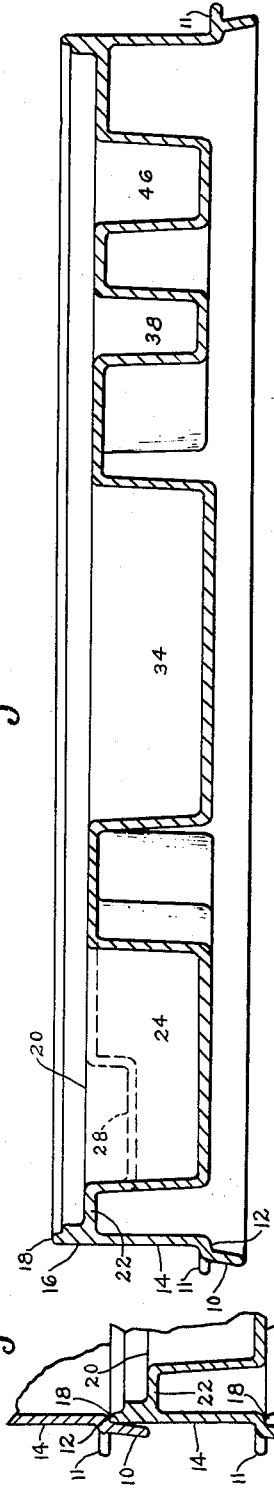
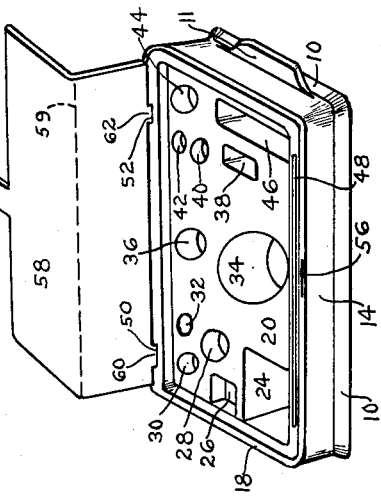
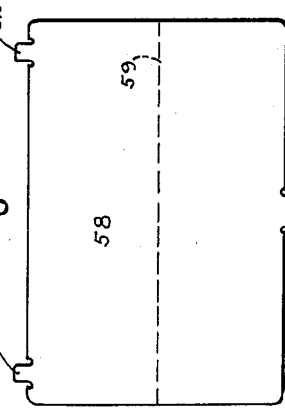
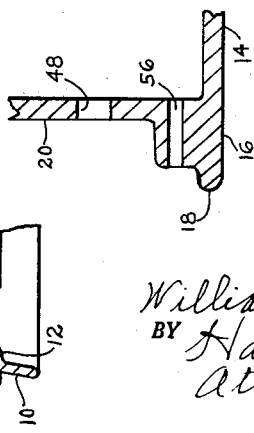
INVENTOR.
William H. Blacker
BY Harold E. Cole
Attorney United States Patent Office 3,057,510
Patented Oct. 9, 1962

3,057,510
TRAY TO SERVE AND HOLD FOOD
William H. Blacker, 1955 Massachusetts Ave.,
Brookline 40, Mass.
Filed May 25, 1960, Ser. No. 31,608
4 Claims. (Cl. 220—97)

This invention relates to a tray for serving foods and other articles, especially one that is particularly adapted for use in airplanes while flying.

One object of my invention is to provide a tray that will serve as a receptacle to separately hold different food while it is being eaten and to hold food utensils, which trays can be easily stacked one upon another.

Another object is to so construct said trays that one part provides a bearing surface intermediate the top and bottom and which rests on the tray below it, while another part provides a top extremity support to receive the bearing surface of the tray above it.

Still another object is to provide a cover for the tray that can readily be attached to the tray and serve as a protector for the food while being carried to the customer.

A still further object is to provide a tray that will receive and hold said cover over the food while being delivered to the patron, yet will retain said cover in a position to serve as a guard for the food at the rear of the tray while the food is being eaten, and will again receive said cover so as to completely cover what is left of the food as it is carried away.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings, nor to the particular parts described in the specification; but am entitled to all such changes therefrom as fall within the scope of my claims.

In the drawings:

FIG. 2 is a sectional view taken on the line 2—2 of FIG. 1.

FIG. 3 is an enlarged, sectional view taken on the line 3—3 of FIG. 1.

FIG. 4 is a top plan view of a cover for the tray.

FIG. 5 is a perspective view of my tray with a cover attached thereto.

FIG. 6 is an enlarged, fragmentary, sectional view showing how my trays are stacked together.

Figure 1:
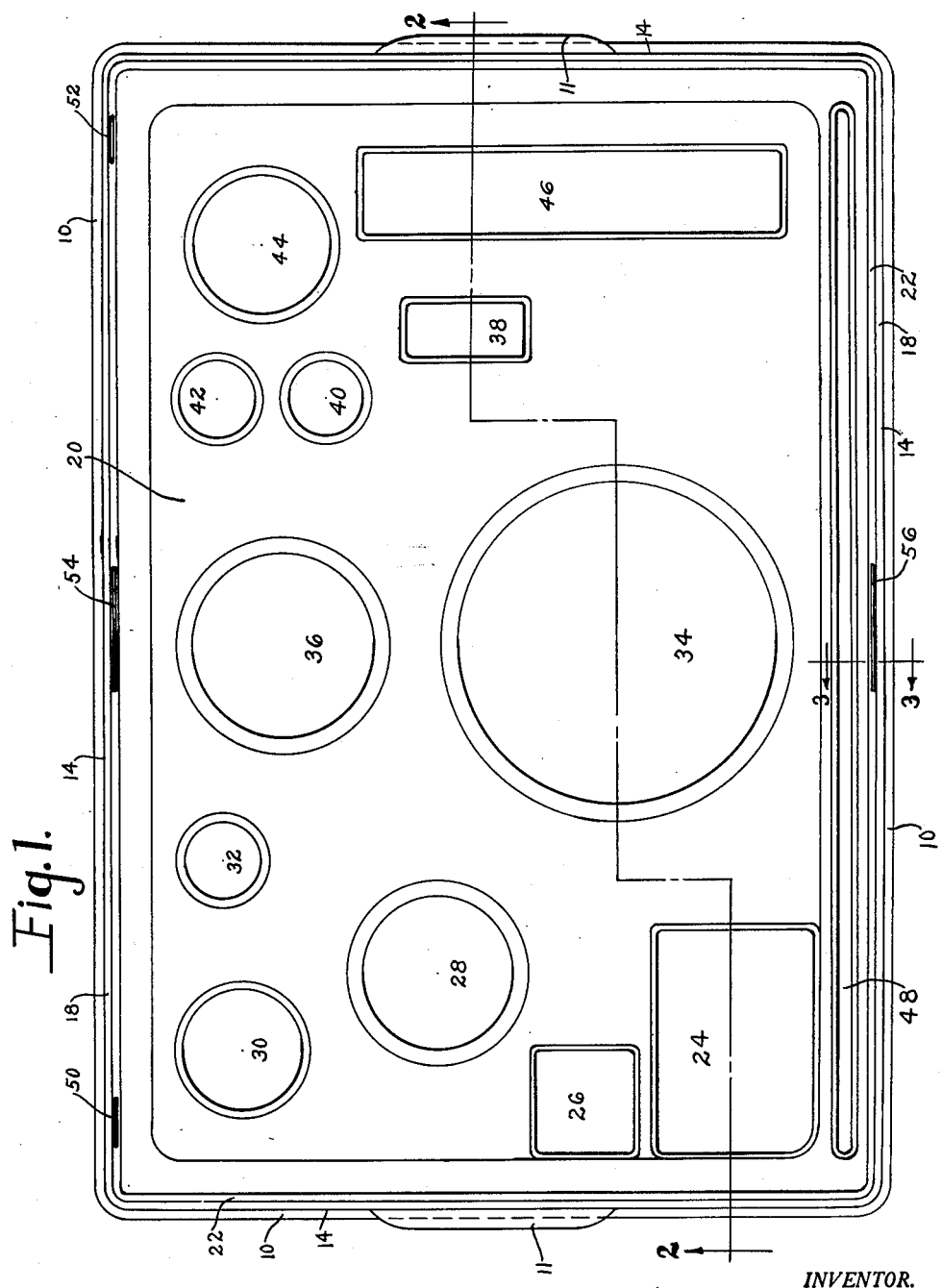
FIG. 1 is a top plan view of my tray.

As illustrated, my tray may be formed of aluminum, plastic, or such inexpensive material as glazed, pressed pulp. It has a base 10 in the form of an endless bottom rim that flares outwardly and may be of rectangular, round or other shape. Handle portions 11 extend laterally outward from said base 10. Above said base rim 10 is a laterally extending bearing portion 12 to support a tray. Next above is an upwardly extending side portion 14. Above said side portion 14 is an upward extension portion 16 from which a supporting portion 18 extends and forms the top extremity of my tray. Said supporting portion 18 is shown reduced in thickness from said extension portion 16.

The main body 20 of my tray provides a top flat portion which connects with said side portion 14 at its outer border as at 22.

Said body portion 20 has a plurality of recesses or cavities formed therein to receive food directly, or receptacles containing food, condiments or the like. I have applied numerals to said recesses as follows: 24 is for bread, 26 for butter, 28 for salad, 30 for fruit cup, 32 for salad dressing, 34 for meat and potatoes or other main dish, 36 for dessert, 38 for envelopes of salt, sugar and pepper, 40 for a container of cream, 42 for a container of syrup, 44 for a beverage cup and 46 for silverware with a napkin. Also an elongate, napkin slot 48 is provided in said top portion 20 to receive and retain therein a portion of a napkin that can extend therefrom over the lap of the user.

One tray may rest upon another to thereby provide a novel stacking arrangement as shown in said FIG. 6. Said bearing portion 12 rests on said supporting portion 18 with said base 10 laterally overlapping said extension portion 16 and supporting portion 18. Thus many trays may be stacked one upon another.

In said top portion 20, at its rear part in position of use, are two side slots 50 and 52, and between them is an intermediate slot 54 preferably centrally located. At the front part thereof is a centrally located slot 56.

A flat cover 58, which may be made of glazed paperboard or other material which usually would be disposable, has a scored portion 59 extending crosswise. At the rear edge it has two side tabs 60 and 62 spaced apart the same distance as said side slots 50 and 52. Said cover also has an intermediate tab 64 that preferably is centrally located at its front edge.

When my tray with food thereon is ready to be carried to a customer or guest, said cover side tabs 60 and 62 are inserted in said tray side slots 50 and 52 and bent over. Said cover central tab 64 is bent and inserted in said tray central slot 56 thus protecting the contents of said tray. When the user is ready to eat, said cover tab 64 is drawn out of said slot 56 and bent over at said scored portion 59 to reverse position and said tab 64 is inserted in said rear slot 54. This keeps the cover out of the way when eating, while it provides a retainer to keep food falling off rearwardly, and keeps it in a position for immediate use when the meal is finished. Then the tab 64 is drawn out of said slot 54 and the cover 58 is placed over the tray and the tab inserted in said front slot 56 to completely cover what is left of the meal.

Said trays may be stacked as illustrated in said FIG. 6 and carried away.

What I claim is:

1. A serving tray comprising a main body portion embodying a bottom, side and top border portion, a base portion outside of said main body portion, a bearing portion above said base portion extending laterally inward, an upwardly extending portion extending from said bearing portion, said main body top border portion extending laterally inward from said upwardly extending portion, and a supporting top portion extending upwardly from said upwardly extending portion and located inwardly of said base portion and adapted to receive and support a bearing portion of a tray above it.

2. A service tray comprising a main body portion embodying a bottom, side and top border portions, said bottom having a plurality of recesses therein, a base portion outside of said main body portion and flaring outwardly, a bearing portion above said base portion extending laterally inward, an upwardly extending portion extending from said bearing portion and being laterally opposite said recesses, said main body top border portion extending laterally inward from said upwardly extending portion, and a supporting top portion extending upwardly from said upwardly extending portion and located inwardly of said base portion and adapted to receive and support a bearing portion of a tray above it.

3. A service tray comprising a main body portion embodying a bottom, side and top border portions, a base portion outside of said main body portion and flaring outwardly, a bearing portion above said base portion extending laterally inward, an upwardly extending portion extending from said bearing portion, said main body top border portion extending laterally inward from said upwardly extending portion, and a supporting top portion extending upwardly from said upwardly extending portion and located inwardly of said base portion and adapted to receive and support a bearing portion of a tray above it, and a handle portion extending laterally outward from said bearing portion and laterally outward beyond said base portion.

4. A service tray comprising a main body portion embodying a bottom, side and top border portions, a base portion outside of said main body portion and extending lower than said bottom, a bearing portion laterally opposite said bottom and above said base portion extending laterally and diagonally inward, an upwardly extending portion extending from said bearing portion, said main body top border portion extending laterally inward from said upwardly extending portion, and a supporting top portion extending upwardly from said upwardly extending portion and located inwardly of said base portion and adapted to receive and support a bearing portion of a tray above it.

References Cited in the file of this patent

UNITED STATES PATENTS

| | | |
|---|---|---|
| D. 122,589 | Bastress | Sept. 17, 1940 |
| 2,210,521 | Bemis | Aug. 6, 1940 |
| 2,677,350 | Prestidge et al. | May 4, 1954 |
| 2,788,932 | German | Apr. 16, 1957 |

FOREIGN PATENTS

| | | |
|---|---|---|
| 1,165,281 | France | May 27, 1958 |